(12) United States Patent
Hall et al.

(10) Patent No.: US 7,393,064 B2
(45) Date of Patent: Jul. 1, 2008

(54) WHEEL HUB WITH IMPROVED PILOT CONSTRUCTION AND A METHOD FOR MANUFACTURING

(75) Inventors: John C. Hall, Hoover, AL (US); Jeremy L. Zills, Cullman, AL (US); Sik-Kan Huang, Albertville, AL (US); Byron E. Cornett, Cullman, AL (US)

(73) Assignee: Webb Wheel Products, Inc., Cullman, AL (US)

( * ) Notice: Subject to any disclaimer, the term of this patent is extended or adjusted under 35 U.S.C. 154(b) by 208 days.

(21) Appl. No.: 11/086,040

(22) Filed: Mar. 22, 2005

(65) Prior Publication Data

US 2005/0236886 A1   Oct. 27, 2005

Related U.S. Application Data

(60) Provisional application No. 60/555,575, filed on Mar. 22, 2004.

(51) Int. Cl.
*B60B 27/00* (2006.01)
(52) U.S. Cl. .............................. 301/105.1; 301/35.627; 29/894.36; 29/527.6; 29/558
(58) Field of Classification Search .................. 301/6.3, 301/36.1, 35.627, 63.101, 105.1; 29/894.36, 29/894.362, 557, 558, 527.6; 188/18 A, 188/218 R, 218 XL
See application file for complete search history.

(56) References Cited

U.S. PATENT DOCUMENTS

| 1,876,393 | A | * | 9/1932 | Booth ..................... 301/105.1 |
| 2,349,220 | A | * | 5/1944 | Eksergian ................ 301/105.1 |
| 2,564,158 | A | * | 8/1951 | Forbes ..................... 301/13.1 |
| 2,781,231 | A | * | 2/1957 | Black ...................... 301/105.1 |
| 4,699,433 | A | * | 10/1987 | Kopp ......................... 301/6.6 |
| 4,986,149 | A |   | 1/1991 | Carmel et al. |
| 5,352,305 | A |   | 10/1994 | Hester |
| 5,492,391 | A | * | 2/1996 | Snook ..................... 301/35.58 |
| 5,586,625 | A |   | 12/1996 | Julow et al. |
| 5,664,648 | A |   | 9/1997 | Hester |
| 5,739,684 | A | * | 4/1998 | Burns ......................... 324/173 |
| 5,782,324 | A |   | 7/1998 | Wall |
| 5,826,684 | A |   | 10/1998 | Hester |
| 5,873,636 | A |   | 2/1999 | Messina et al. |
| 5,898,997 | A | * | 5/1999 | Meeker et al. ........... 29/894.362 |
| 6,247,547 | B1 | * | 6/2001 | Lemke et al. ................ 180/9.5 |
| 6,257,678 | B1 | * | 7/2001 | Brookey et al. ........... 301/105.1 |
| 6,364,426 | B1 | * | 4/2002 | Horne et al. .............. 301/105.1 |
| 6,572,712 | B2 |   | 6/2003 | Powell et al. |
| 6,604,794 | B1 | * | 8/2003 | Messina ...................... 301/6.6 |
| 6,612,657 | B1 | * | 9/2003 | Fakhoury et al. ......... 301/105.1 |
| 6,702,398 | B2 | * | 3/2004 | Laps ........................ 301/105.1 |
| 6,829,825 | B1 | * | 12/2004 | Bowman et al. .......... 29/894.32 |

(Continued)

FOREIGN PATENT DOCUMENTS

EP   0 133 922   7/1984

*Primary Examiner*—Russell D Stormer
(74) *Attorney, Agent, or Firm*—Patzik, Frank & Samotny Ltd.

(57) ABSTRACT

The present invention provides a drum or rotor wheel hub having a cast hub having a machined pilot in a flange portion and a machined pilot in a cylindrical portion, and a cast portion which separates the cylindrical pilot from the flange pilot, whereby a machined radii is not incorporated in the pilot construction.

4 Claims, 7 Drawing Sheets

U.S. PATENT DOCUMENTS

| | | | |
|---|---|---|---|
| 6,880,682 B2 * | 4/2005 | Gotti et al. | 188/218 XL |
| 7,111,911 B2 * | 9/2006 | Baumgartner et al. | 301/105.1 |
| 7,159,316 B2 * | 1/2007 | Sadanowicz et al. | 29/894.361 |
| 2003/0146657 A1 | 8/2003 | Messina | 301/63.101 |

* cited by examiner

WHEEL HUB WITH IMPROVED PILOT CONSTRUCTION AND A METHOD FOR MANUFACTURING

PRIORITY

This application claims priority from U.S. Provisional Patent Application Ser. No. 60/555,575, filed Mar. 22, 2004.

FIELD OF THE INVENTION

The invention relates, generally, to vehicle wheel assemblies used in vehicles such as trucks, buses and trailers, and more particularly, to pilot constructions on such vehicle hubs.

BACKGROUND OF THE INVENTION

The prior art includes wheel hubs for vehicles, including medium and heavy-duty trucks, trailers and buses. In one embodiment, the hubs include a stud pilot construction. Studs are passed through a flange of the hub and may be used for centering the brake drum and wheels which are mounted on the hub. In some prior art systems, the studs are used for centering only one of the wheel and drum, typically the wheel.

U.S. Pat. No. 5,739,684 C1 issued to Burns and is assigned to the assignee of the present invention. Burns shows a prior art hub with a drum and wheel pilot arrangement. The hub is typically cast or forged and then machined to form a plurality of drum pilots which engage the corresponding pilot on the brake drum, and to form a plurality of wheel pilots which each engage the corresponding pilot on the wheel or wheels. The bolts used to mount the brake drum and wheel are not used to center the drum and wheels, rather the hub pilots are used to center the drum and wheels with respect to the hub. Typically the hub is machined with the drum pilot having a radius which is larger than the radius of the wheel pilot. Pairs of wheel pilots and drum pilots may be longitudinally aligned with one another and form a continuous machined surface having two right angles, the first separating the wheel pilot and the drum pilot. The second right angle separating the drum pilot from the hub flange. In any event, each pilot is associated with at least one right angle.

As suggested before, the right angles in the pilot construction are formed by a machining process. The prior art pilot construction incorporates a machined radius into the part. The machined radii introduce stress risers in the area of the pilots. The stress risers decreases fatigue life of the hub. The stress risers can be compensated by strengthening the hub such as by increasing the thickness of the cylindrical wall of the hub.

Industry trends and recent developments in hub technology have lead to lighter hub construction. Unfortunately, the light weight hub construction impacts adversely on the stress risers associated with the pilot construction.

It is desirable to provide a hub pilot construction which is not associated with a decreased fatigue life. It is also desirable to provide a pilot construction which does not produce stress risers in the area of the pilot construction. It is further desirable to provide a hub construction which does not have the associated stress risers and which is light weight. It is further desirable to provide a casting where pilots are used at the junction where a flange is joined to a cylindrical body and without producing stress risers.

SUMMARY OF THE INVENTION

It is an object of the present invention to provide a casting where pilots are used at the junction where a flange is joined to a cylindrical body, without reducing the fatigue life.

It is an object of the present invention to provide a hub having an increased fatigue life.

It is a further object of the present invention to provide a hub which eliminates the stress risers and is light weight.

It is still a further object of the present invention to provide a lightweight hub having drum and wheel pilots but without reducing the fatigue life of the hub.

The invention includes the design of a hub such that the wheel and drum pilots do not have a machined radii where these pilots interface with the hub body, hub flange or both.

The present invention therefore provides in one embodiment, a wheel hub comprising a cast hub having a machined pilot in a flange portion and a machined pilot in a cylindrical portion, and a cast portion which separates the cylindrical pilot from the flange pilot, whereby a machined radii is not incorporated in the pilot construction.

The present invention further provides in another embodiment, a method of manufacturing a wheel hub, comprising casting a hub, machining a pilot in a flange portion, machining a pilot in a cylindrical portion, leaving a cast portion between the flange pilot and the cylindrical portion, whereby machined radii are not incorporated in the pilot construction.

DETAILED DESCRIPTION OF THE INVENTION

Figure 1:
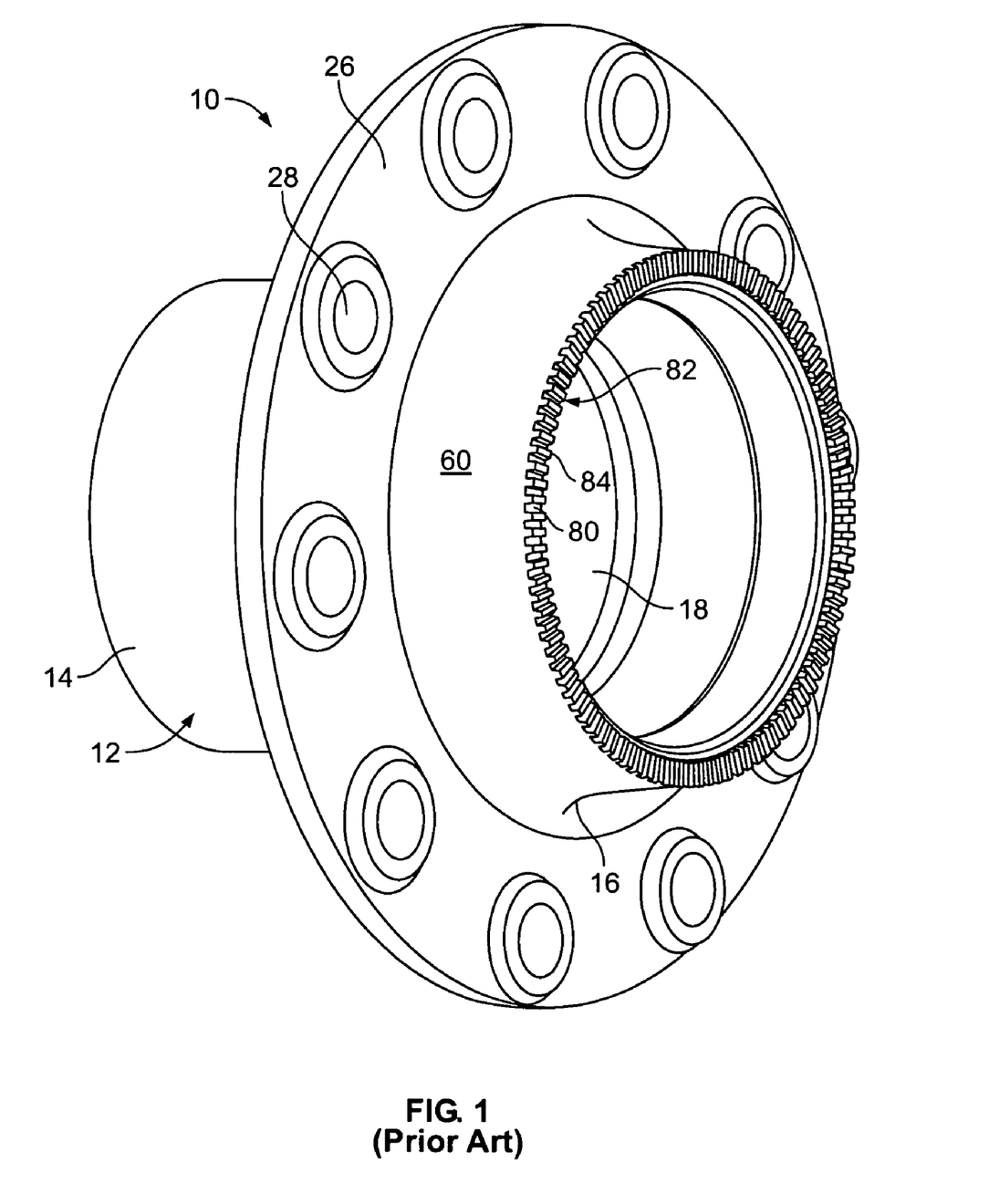
FIG. 1 is a perspective view of the inboard side of a prior art.
Figure 2:
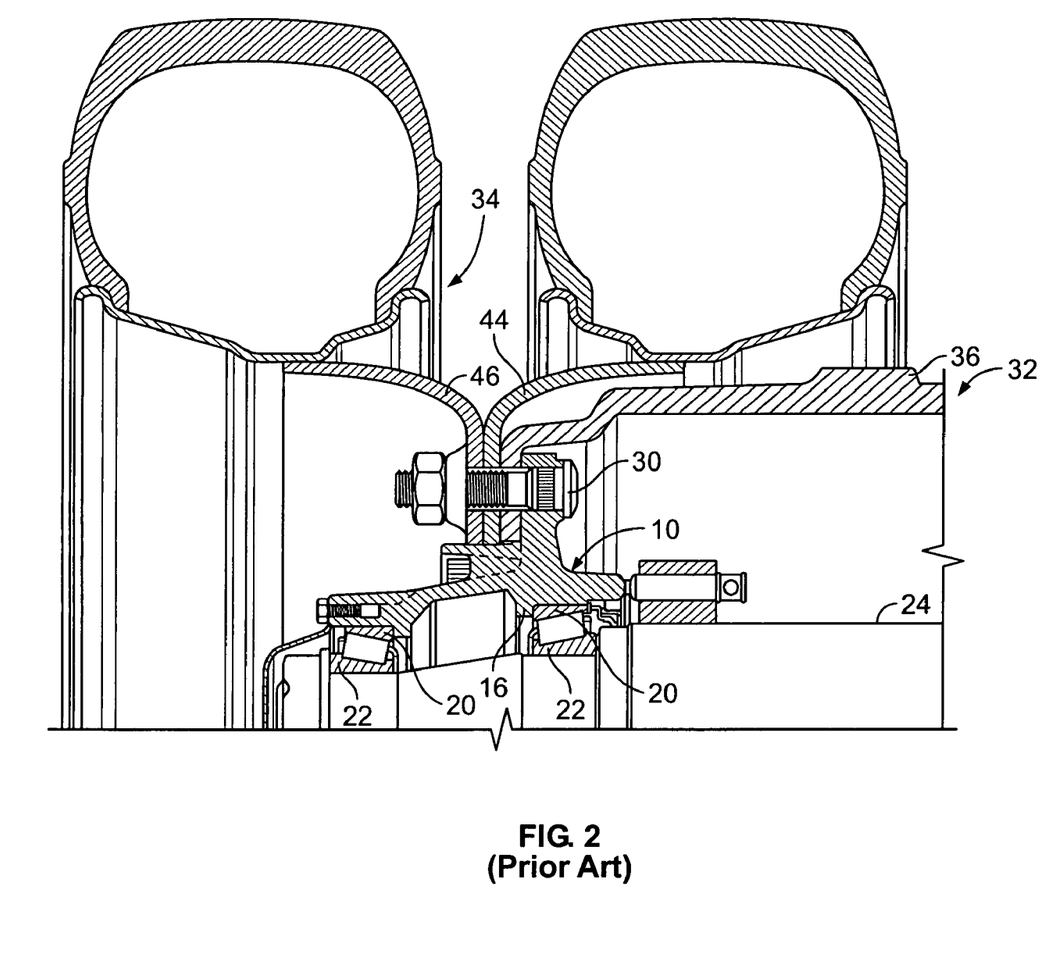
FIG. 2 is a cross sectional view of a wheel assembly with the prior art hub of FIG. 1.

A prior art hub is shown in FIG. 1 and generally designated at 10. The term hub is used throughout the application and should be understood as referring to a hub of transportation vehicles, for example, the hubs of trucks, buses and trailers. Referring to FIGS. 1 and 2, the hub 10 includes a generally cylindrical body 12, which includes an outboard extension 14 and an inboard extension 16. The cylindrical body 12 defines a substantially cylindrical interior passageway 18 which includes bearing cups 20 which are adapted to engage roller bearing 22 to rotatably mount the hub to the vehicle axle 24 or other suspension component of the vehicle.

The hub 10 also includes a mounting flange 26 extending radially from the cylindrical body 12. The radially extending mounting flange 26 assists in defining the inboard section 16 and outboard section 14 of the hub 10. Equidistantly spaced openings 28 are formed in the mounting flange 26 and are adapted to receive wheel mounting studs 30 for mounting a brake drum 32 to the inboard section 16 of the hub 10 and for mounting a wheel and tire assembly 34 to the outboard section 14 of the hub 10.

Figure 3:
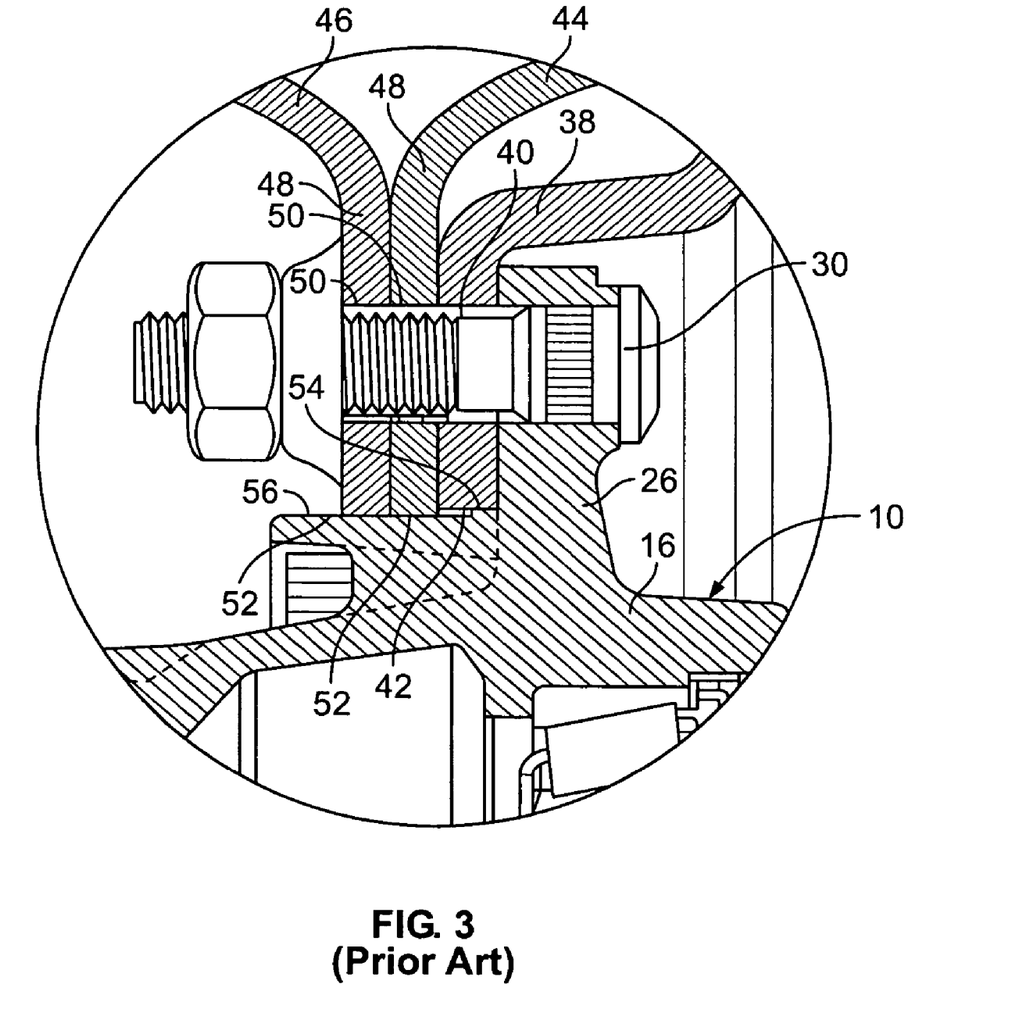
FIG. 3 is an enlarged view of detail A of the prior art hub of FIG. 2.

Referring to FIGS. 1-3, the brake drum 32 includes a generally cylindrical portion 36 and a mounting portion or flange 38. The mounting flange includes equidistantly spaced openings 40 adapted to receive the wheel mounting studs 30 for mounting the brake drum as noted above. The mounting flange further forms a cylindrical opening is which is defined by an annular surface or pilot 42. The wheel and tire assembly 34 includes an inboard wheel 44 and an outboard wheel 46. Both the inboard wheel and outboard wheel include a mounting flange 48 having equidistantly spaced openings 50 adapted to receive the wheel mounting studs 30 for mounting the wheel and tire assembly as noted above. The inboard wheel and outboard wheel also each include a circular opening defined by an annular surface or pilot 52. FIG. 3 shows that the hub includes a drum pilot 54 adjacent the mounting flange 26 and on the side of the outboard section. The drum pilot 54 is engaged with the drum, specifically, with the pilot 42 of the drum. The hub further includes a wheel pilot 56 which extends from the drum pilot in a direction away from the mounting flange 26 and towards the outboard section 16. The wheel pilot 56 is engaged with the pilot 52 of each of the wheels. Such an arrangement provides a hub piloted disc wheel system as appreciated by those skilled in the art. This is in contrast to a stud piloted disc wheel arrangement. While the present invention finds utility particularly in the hub piloted disc wheel arrangement, the stud piloted disc wheel arrangement also benefits from the present invention. The hub shown includes pulse teeth for an anti-lock brake system. However, the present invention is not limited to hubs for an ABS system. In addition, a two wheel system is shown in the drawings. However, the present invention is not limited to a two wheel system.

Figure 4:
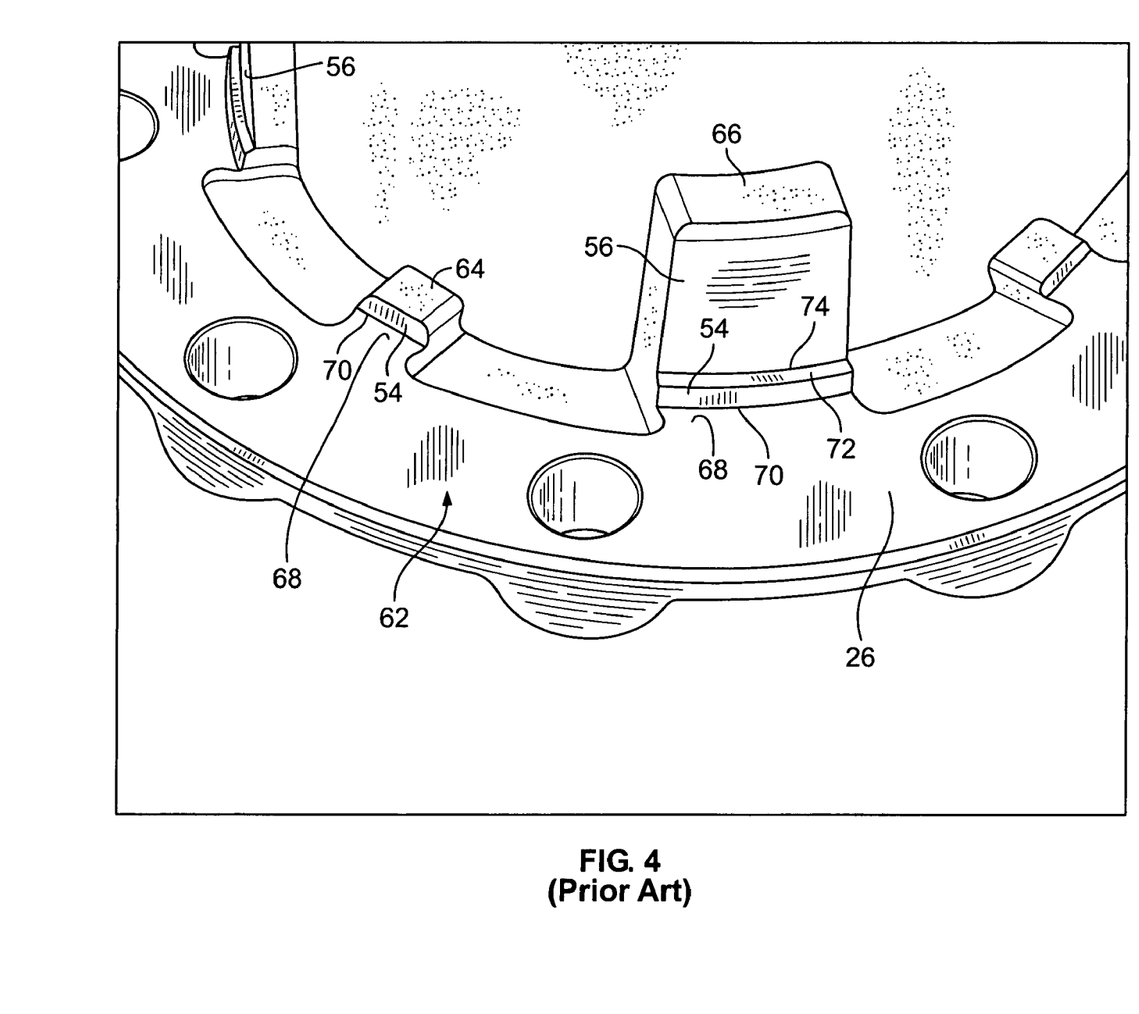
FIG. 4 is a close up view of the outboard side of the prior art hub of FIG. 1.

FIG. 4 is a close up view of the outboard side of the prior art hub of FIG. 1. The outboard extension and the mounting flange are shown. A plurality of brake drum pilots 54 and wheel pilots 56 are shown. The hub 10 is generally formed as a casting or forging and is made from a ferrous material preferably ductile iron or cast steel. Alternatively, other ferrous materials such as steel forging or austempered ductile iron may be used in forming the hub. The bearing cups bores, sealing bores and openings 28 are machined and drilled to their proper dimensions in a manner well-known in the art. The outside surface 60 (FIG. 1) of the inboard portion 16 of the hub 10 is not required to be machined for the invention to work in its intended manner. However, the outside surface 60 of the inboard section 16 may be machined for cosmetic purposes.

The mounting flange 26 is machined leaving a machined surface 62. A plurality of small protrusion 64 and large protrusions 66 of the outboard section are also machined during the process of machining the mounting flange 26 and form machined surface extensions 68. The brake drum pilots 54 are also machined in the large and small protrusions. The brake drum pilots and respective machined surface extension 68 form a generally right angle at a transition area 70. The transition area 70 provides a machined radius. The large protrusions are further machined and form the wheel pilots 56 and a corresponding ridge surface 72. The wheel pilots 56 and ridge surface 72 form a generally right angle at a transition area 74. The transition area 74 provides a machined radius. It is appreciated that the machining process leaves the small protrusions 64 with the drum pilot 54 and a corresponding transition area 70, and leaves the large protrusions 66 with a drum pilot 54 and wheel pilot 56 and two corresponding transition areas 70, 74.

In the event the hub is to be configured for an ABS system, a plurality of radially extending grooves 80 are formed in the annular end face 82 of the inboard portion 16 of the hub 10 forming a series of radially extending pulse teeth 84. The grooves 80 and the corresponding pulse teeth 84 are machined, preferably by using super abrasive machining ("SAM") or an abrasive cutter. Alternatively, milling, broaching, laser cutting or other methods of removing metal may be utilized to form the grooves 80.

Figure 5:
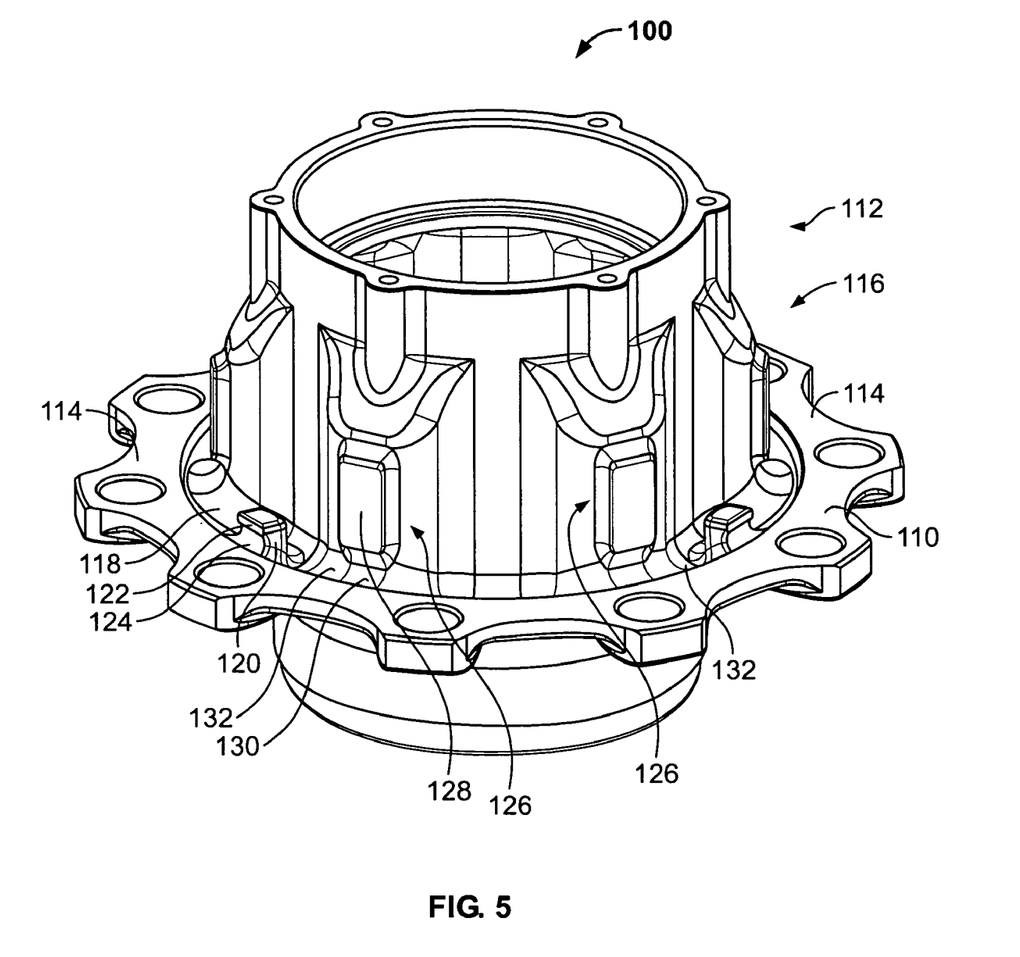
FIG. 5 is a perspective view of the outboard side of the hub of the present invention.

Referring to FIG. 5, a perspective view of the outboard side of the hub 100 of the present invention is shown. The mounting flange 110 and outboard section 112 are readily apparent. The mounting flange includes a machined surface 114. The machined surface of the mounting flange and the cylindrical body 116 are joined by a bridge portion 118. A plurality of protrusions 120 extend upwardly from the bridge portion. A brake drum pilot 122 is machined in the upwardly extending protrusion. A cast surface or area 124 is shown between the drum pilot 122 and the mounting flange machined surface 114. Protrusions 126 extending from the outboard section are shown to be machined to form a wheel pilot 128 with a cast surface or area 130 between the wheel pilot 128 and the machined surface 114 of the mounting flange. The embodiment of FIG. 5 shows the wheel pilots 128 radially spaced apart from the drum pilots 122.

Figure 6:
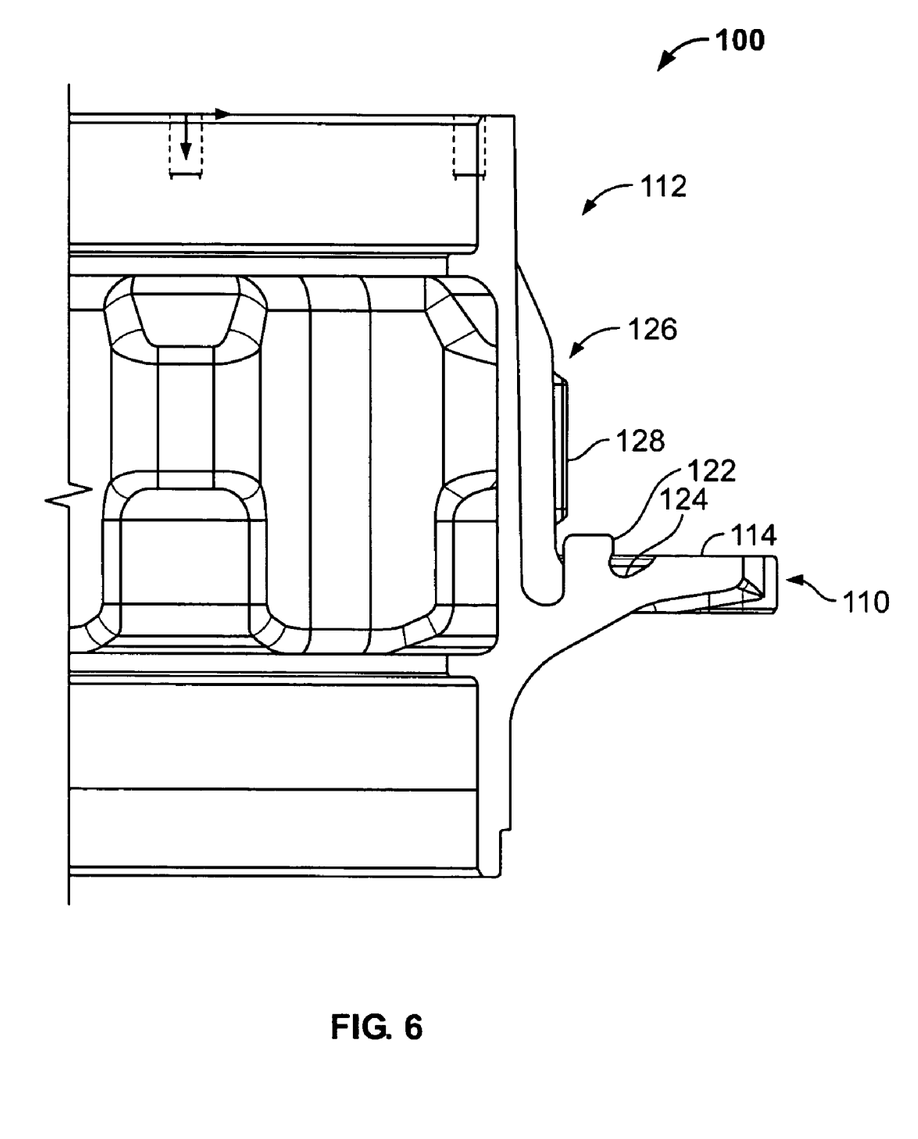
FIG. 6 is a partial cross sectional view of the hub of FIG. 5, showing a detailed view of the brake drum pilot of the present invention.
Figure 7:
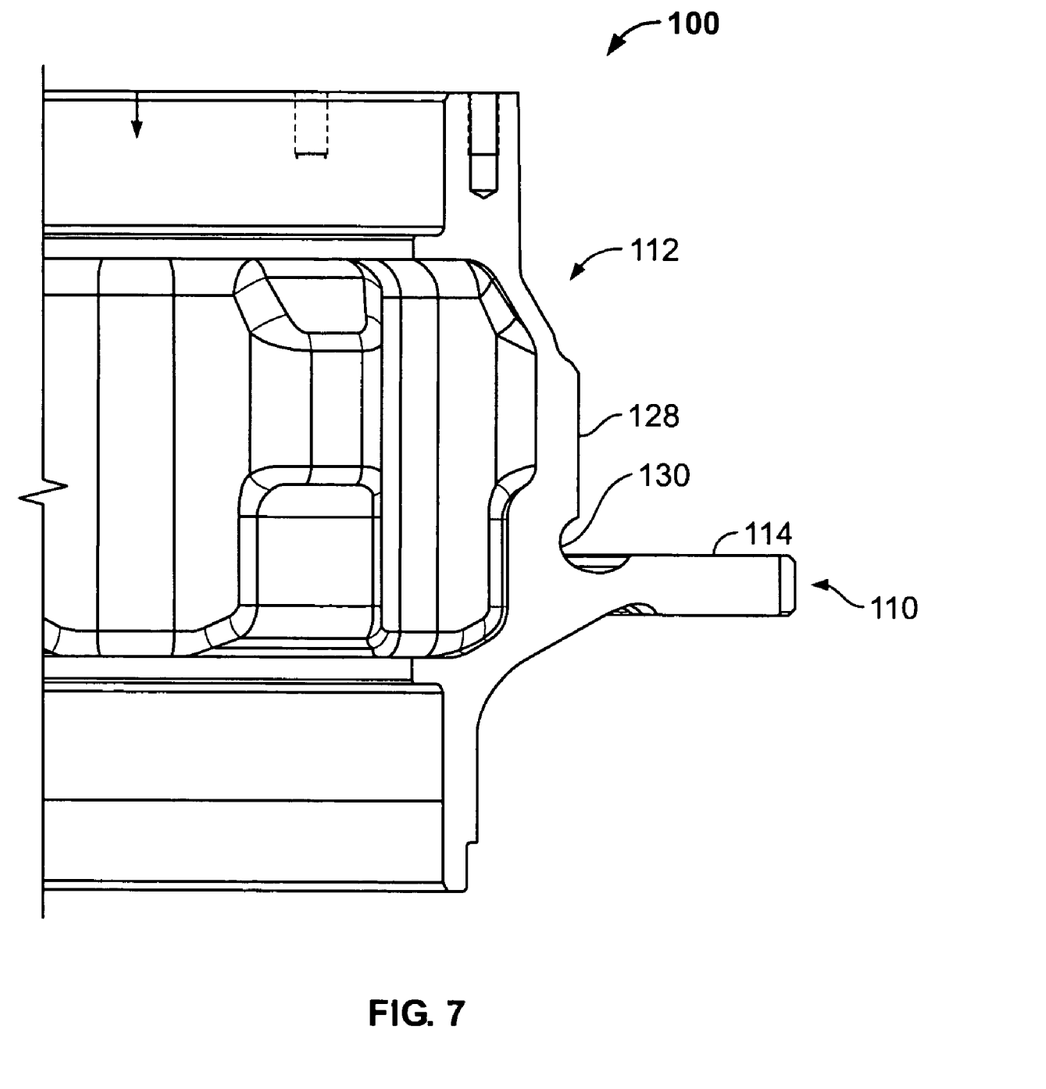
FIG. 7 is another partial cross sectional view of the hub of FIG. 5, showing a detailed view of the wheel pilot of the present invention.

FIG. 6 is a partial cross sectional view of the hub of FIG. 5, showing a detailed view of the brake drum pilot 122 of the present invention. It can be seen that the drum pilot 122 is separated from the machined surface 114 of the mounting flange by a cast surface or area 124. A wheel pilot 128 is also shown. However, FIG. 7 is another partial cross sectional view of the hub 100 of FIG. 5, showing a better detailed view of the wheel pilot 128 of the present invention. The cross sectional view of FIG. 7 is slightly rotated in comparison to the view of FIG. 6. It can be seen that the wheel pilot 128 is separated from the machined surface 114 of the mounting flange by a cast surface or area 130. Referring back to FIG. 5, it can be seen that the wheel pilot 128 and the drum pilot 122 are separated by a cast surface or area 132.

The invention includes a method as suggested from the foregoing, wherein a hub is provided. The hub is machined to provide the drum pilot and machined surface spaced apart from one another by a surface which has not been machined. The hub is machined to provide the wheel pilot and machined surface spaced apart from one another by a surface which has not been machined. The hub is machined so that there is no transition area with a machined radius.

What is claimed:

1. A vehicle hub comprising:
   a cylindrical body having an outer surface with a plurality of protrusions, the protrusions each having a machined wheel pilot surrounded by a non machined surface; and
   a mounting flange extending radially from the cylindrical body, the mounting flange having a machined surface coupled to the cylindrical body by a non machined web, a plurality of protrusions extend from the web in a generally outboard direction, each web protrusion having a machined brake drum pilot surrounded by a non machined surface, wherein the wheel pilots are both radially and angularly spaced apart from the drum pilots, and both the wheel pilots and drum pilots are disposed on a same side of the vehicle hub, relative to the mounting flange.

2. The hub of claim 1, wherein the hub is cast, the non machined surfaces are cast surfaces.

3. A cast vehicle hub comprising:
a cylindrical body having a plurality of angularly spaced apart machined wheel pilots, each wheel pilot surrounded by a cast surface;
a mounting flange extending radially from the cylindrical body and having a machined surface;
a web spanning between the cylindrical body and the machined surface, the web having a plurality of radially spaced apart machined drum pilots, each pilot surrounded by a cast surface, wherein the wheel pilots are both radially and angularly spaced apart from the drum pilots, and both the wheel pilots and drum pilots are disposed on a same side of the vehicle hub, relative to the mounting flange.

4. A method of manufacturing a vehicle hub, comprising:
casting a hub having a generally cylindrical body and a radially extending mounting flange, the cylindrical body having angularly spaced apart first protrusions and the mounting flange having second protrusions which extend away from the cylindrical body and towards the outboard side of the hub, wherein the first protrusions are both radially and angularly spaced apart from the second protrusions, and both the first and second protrusions are disposed on a same side of the vehicle hub, relative to the mounting flange;
machining a surface on the mounting flange and leaving a cast surface between the machined surface and the protrusions;
machining a drum pilot in the protrusions extending towards the outboard side, and leaving a cast surface between the drum pilots and the machined surface and between the drum pilots and the protrusions on the cylindrical body;
machining a wheel pilot in the protrusions of the cylindrical body, and leaving a cast surface between the wheel pilots and the machined surface, and between the wheel pilots and the protrusions extending towards the outboard side.

* * * * *